United States Patent [19]

Rohleder

[11] Patent Number: 4,884,637

[45] Date of Patent: Dec. 5, 1989

[54] GROUND/TURF AERATOR

[76] Inventor: Brian J. Rohleder, Twyford Road, RD 5, Hastings, New Zealand

[21] Appl. No.: 123,264

[22] Filed: Nov. 20, 1987

[30] Foreign Application Priority Data

Jul. 23, 1987 [NZ] New Zealand .......................... 221176

[51] Int. Cl.$^4$ .............................................. A01B 45/02
[52] U.S. Cl. ........................................ 172/22; 172/125
[58] Field of Search ............................. 172/21, 22, 125

[56] References Cited

U.S. PATENT DOCUMENTS

| | | | |
|---|---|---|---|
| 2,347,748 | 5/1944 | Melling | 172/21 |
| 3,429,378 | 2/1969 | Mascaro | 172/22 |
| 3,834,464 | 9/1974 | Carlson | 172/125 X |
| 4,003,439 | 1/1977 | van der Lely | 172/125 X |
| 4,602,687 | 7/1986 | Hansen | 172/22 |
| 4,606,411 | 8/1986 | Classen | 172/22 |
| 4,658,909 | 4/1987 | McDermott | 172/22 |

FOREIGN PATENT DOCUMENTS 0661287 11/1951 United Kingdom .................. 172/21

*Primary Examiner*—Randolph A. Reese
*Assistant Examiner*—Jeffrey L. Thompson
*Attorney, Agent, or Firm*—Fleit, Jacobson, Cohn, Price, Holman & Stern

[57] ABSTRACT

A ground coring and/or aerating apparatus having a crank assembly carrying ground coring devices such that as the apparatus advances over the ground the ground coring devices periodically enter the ground and withdraw threrfrom, a skid disposed and biased to apply pressure on the surface about an opening or openings such as slots through which the ground coring devices pass, ramp members forming part of the skid to guide uplifted soil, turf or the like, down to the same level as the general bottom surface of the skid, transmission including a gearbox which enables rapid gearing adjustment, cranking assembly including two synchronized eccentric driving members each cranking through its own connecting member, the connecting members being substantially mutually at right angles, and a supporting frame on which the transmission is mounted and from which the ground coring devices and skid depend.

11 Claims, 9 Drawing Sheets

GROUND/TURF AERATOR

BACKGROUND OF THE INVENTION

1. Field of the Invention

The present invention relates to improvements in and or relating to a ground/turf aerator and/or corer suitable for use, for example, in the coring of turfed ground such as found on fairways, sports fields and the like.

2. Description of the Prior Art

Aerators are known which press a set of spikes or tubes (preferably tubes) into the ground as a machine advances leaving along the locus of advancement of the machine a transverse array of aerating/core holes as well as some degree of loosening of the ground structure about the holes. One such apparatus is that for example disclosed in my New Zealand Patent Specification No. 181505, the full content of which is hereby incorporated herein by way of reference.

BRIEF SUMMARY OF THE INVENTION

The present invention consists in ground coring apparatus which provides at least one advantage or variation over existing ground coring machines and apparatus.

In one aspect the invention provides a ground coring and/or aerating apparatus having a frame capable of being advanced in a direction of advancement, a device providing a transmission of power to a crank assembly carried by the frame, a device driven by the crank assembly having ground coring means dependent therefrom, the construction and arrangement being such that the action of the crank assembly on the ground coring means periodically presses the coring means into the ground and withdraws the same therefrom while the frame advances, and a skid device dependent from the frame disposed and biased to present a ground pressuring surface about an opening or slot (hereafter "opening") through which a ground coring means can pass into the ground and from which it can be withdrawn from the ground, the opening (having regard to the direction of advancement) including trailing means to guide uplifted soil, turf or the like down to the same level as the general bottom surface of the skid.

Preferably the device providing a transmission of power to a crank assembly includes a gearbox having a housing, an input shaft, an intermediate shaft and an output shaft, there being a gear drive from the input shaft to the intermediate shaft and additionally from the intermediate shaft to the output shaft, and wherein means is provided to facilitate the removal from and replacement of a gear of the intermediate shaft plus the complementary gear of one other of the shafts to enable the adjustment of the ratio of the gearbox.

Preferably the cranking assembly includes two synchronized eccentric driving members each cranking through its own connecting member, the connecting members being substantially mutually at right angles and supporting means (which can be an extension of one connecting member) from which the ground coring and/or aerating means is dependent.

Preferably each ground coring means includes a plurality of ground penetrating members each of which periodically passes through and withdraws from its own opening in the skid means, each opening having a trailing boundary thereof and trailing means to guide uplifted soil, turf or the like down to the same level as the general bottom surface of the skid.

Preferably the skid means is spring biased to ride on the ground but nevertheless is capable of upward movement against the bias of the spring or springs.

In another aspect the present invention provides a ground coring and/or aerating apparatus including a frame capable of being advanced in a direction of advancement, a device providing a transmission of power to a crank assembly carried by said frame, a device driven by the crank assembly having ground coring means dependent therefrom, the construction and arrangement being such that the action of the crank assembly on the ground coring means periodically presses the coring means into the ground and withdraws the same therefrom while the frame advances, and wherein the apparatus includes at least one of the following improvements:

a. the transmission to the crank assembly includes a gear box having a housing, an input shaft, an intermediate shaft and an output shaft, there being a gear drive from the input shaft to the intermediate shaft and additionally from the intermediate shaft to the output shaft and wherein means is provided to facilitate the removal from and replacement of a gear of the intermediate shaft plus the complementary gear of one other of the shafts to enable the adjustment of the ratio of the gear box, the arrangement being such that adjustments can be made to take into account the normal operating ground speed;

b. skid means disposed and biased to present a ground pressuring surface about an opening (or slot) (hereafter "opening") through which a ground coring means can pass into the ground and from which it can be withdrawn from the ground, the opening (having regard to the direction of advancement) including trailing means to guide uplifted soil, turf or the like down to the same level as the general bottom surface of the skid; and c. the cranking assembly includes two synchronized eccentric driving members each cranking through its own connecting member, the connecting members being substantially mutually at right angles and supporting means from which the ground coring and/or aerating means is dependent.

In the preferred form of the present invention the apparatus includes all or at least two of the above means a, b and c.

In a further aspect the invention provides a ground coring and/or aerating apparatus including a frame capable of being advanced in a direction of advancement, a device providing a transmission of power to a crank assembly dependent from the frame, a device driven by the crank assembly having ground coring means dependent therefrom, the construction and arrangement being such that the action of the crank assembly on the ground coring means periodically presses the coring means into the ground and withdraws the same therefrom while the frame advances, the construction being characterized in that the transmission to the crank assembly includes a gear box having a housing, an input shaft, an intermediate shaft and an output shaft, there being a gear drive from the input shaft to the intermediate shaft and additionally from the intermediate shaft to the output shaft and wherein means is provided to facilitate the removal from and replacement of a gear of the intermediate shaft plus the complementary gear of one other of the shafts to enable the adjustment of the ratio of the gear box, the arrangement being such that adjustments can be made to take into account the normal operating ground speed.

In yet a further aspect the invention provides a ground coring and/or aerating apparatus including a frame capable of being advanced in a direction of advancement, a device providing a transmission of power to a crank assembly dependent from the frame, a device driven by the crank assembly having ground coring means dependent therefrom, the construction and arrangement being such that the action of the crank assembly on the ground coring means periodically presses the coring means into the ground and withdraws the same therefrom while the frame advances, the construction being characterized in that the cranking assembly includes two synchronized eccentric driving members each cranking through its own connecting member, the connecting members being substantially mutually at right angles and supporting means (which can be an extension of one connecting member) from which the ground coring and/or aerating means is dependent.

In yet a further aspect the invention provides a ground coring and/or aerating apparatus including a frame carried at least in part on ground wheels and which is capable of being advanced in a direction of advancement, a gear box carried by the frame, the gear box having a housing, an input shaft, an intermediate shaft and an output shaft, there being a gear drive from the input shaft to the intermediate shaft and additionally from the intermediate shaft to the output shaft, and means to connect the input shaft to a power takeoff (P.T.O.) or to the output of an engine, a rotatable shaft or shaft assembly (hereafter shaft assembly) that extends transversely of the frame (having regard to the direction of advancement) which is rotatable by transmission from the output shaft output of the gear box, the shaft assembly driving directly or indirectly a plurality of sets of spaced pairs (with regard to their axes of rotation) of eccentric driving members, each eccentric driving member having an axis of rotation, ground coring means carried by means dependent from a pair of the eccentric driving members, the means carrying the coring means being cranked by each eccentric driving member through cranking arms, one cranking arm being connected to the means carrying the coring means while the other cranking arm cranks the means carrying the coring means through a pivot on a pivot axis parallel to the rotational axis which provides the rotation of the eccentric driving members, the arrangement being such that during a cranking cycle which causes the dependent ground coring means to advance, lower, rise and trail before commencing a new cycle to be such that the cranking arms act substantially at right angles relative to each other throughout, and skid means dependent from the frame capable of moving upwardly and downwardly relative thereto which provides a skid presenting at least one opening or slot through which the ground coring means can pass into the ground as the apparatus advances, the skid means providing a ground pressuring about the coring as it is taking place.

Preferably each opening or slot of the skid means apparatus includes at its trailing extremity means to guide uplifted soil, turf or the like down to the same level as the general bottom surface of the skid means, preferably a ramp member.

Preferably the skid means rises and lowers in a guidable fashion relative to the frame of the apparatus, but is spring biased to assert a pressure on the ground during normal operation.

BRIEF DESCRIPTION OF THE DRAWINGS

One preferred embodiment of the present invention will now be described with reference to the accompanying drawings wherein.

DETAILED DESCRIPTION

Figure 3:
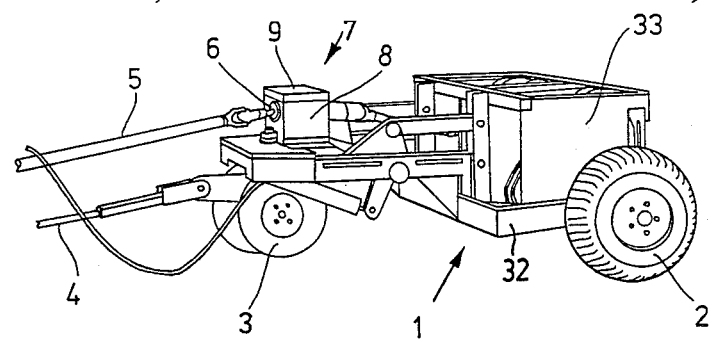
FIG. 3 is a perspective view of the preferred overall apparatus, its advance direction being to the left.

The preferred form of apparatus is that as depicted in the accompanying drawings. FIG. 3 shows a frame 1 having trailing ground wheels 2 (one on each side) and a dolly wheel 3 at the front end in the advance direction capable of being towed by a towing arm 4. A telescopic power take off (PTO) shaft 5 connects to the input shaft 6 (see FIG. 8) of a gear box 7 having a housing 8 with a removable lid or side 9 to allow easy access to the interior thereof.

Figure 10:
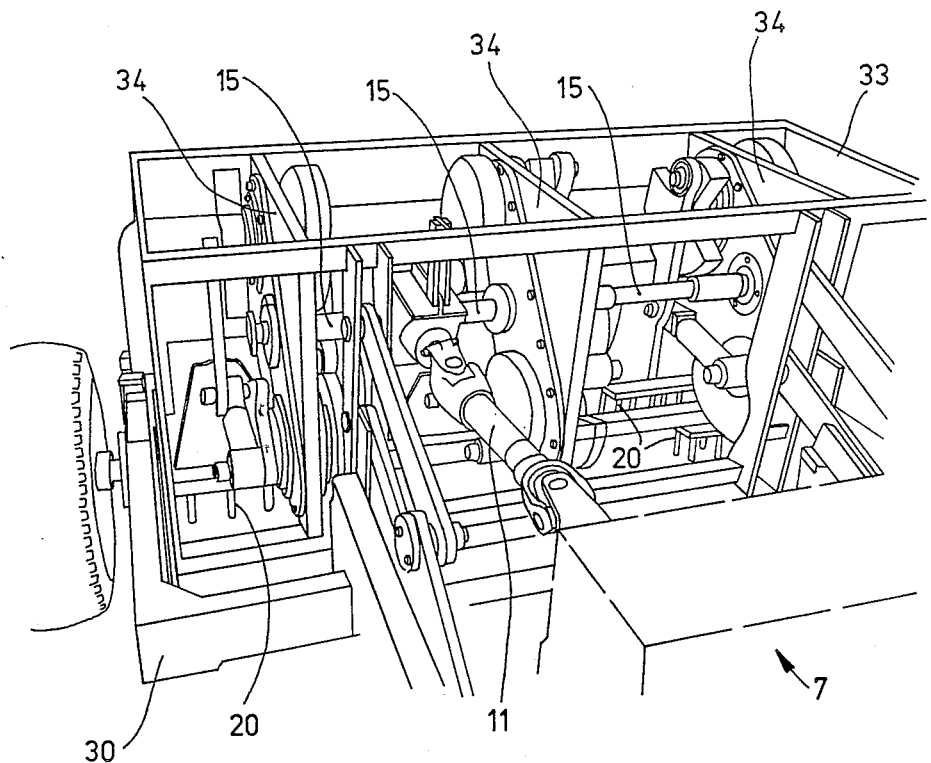
FIG. 10 is a perspective view from the front of a power transmission shaft rearwardly of the gear box to a transverse splined assembly of drives to the input cog of three sets of pairs of eccentrics as shown in FIGS. 1 and 4 (one pair being shown in FIG. 5), each pair having out of phase coring means.

The gear box 7 includes an output shaft 10 from which a transmission shaft 11 (see FIG. 10) takes the drive rearwardly to transversely interconnected driving cogs 12 (see FIG. 4) of paired eccentrics 13 driven directly by each cog 12 through idle cogs 14. The drive cogs 12 are on a splined shaft allowing for interconnection transversely of the drive received from the shaft 11 (FIG. 10) through at least three pairs of drive cogs 12 across the transverse width. The transverse shaft 15 can be seen in FIG. 10 and is preferably segmented in structure to allow for ease of manufacture.

Figure 5:
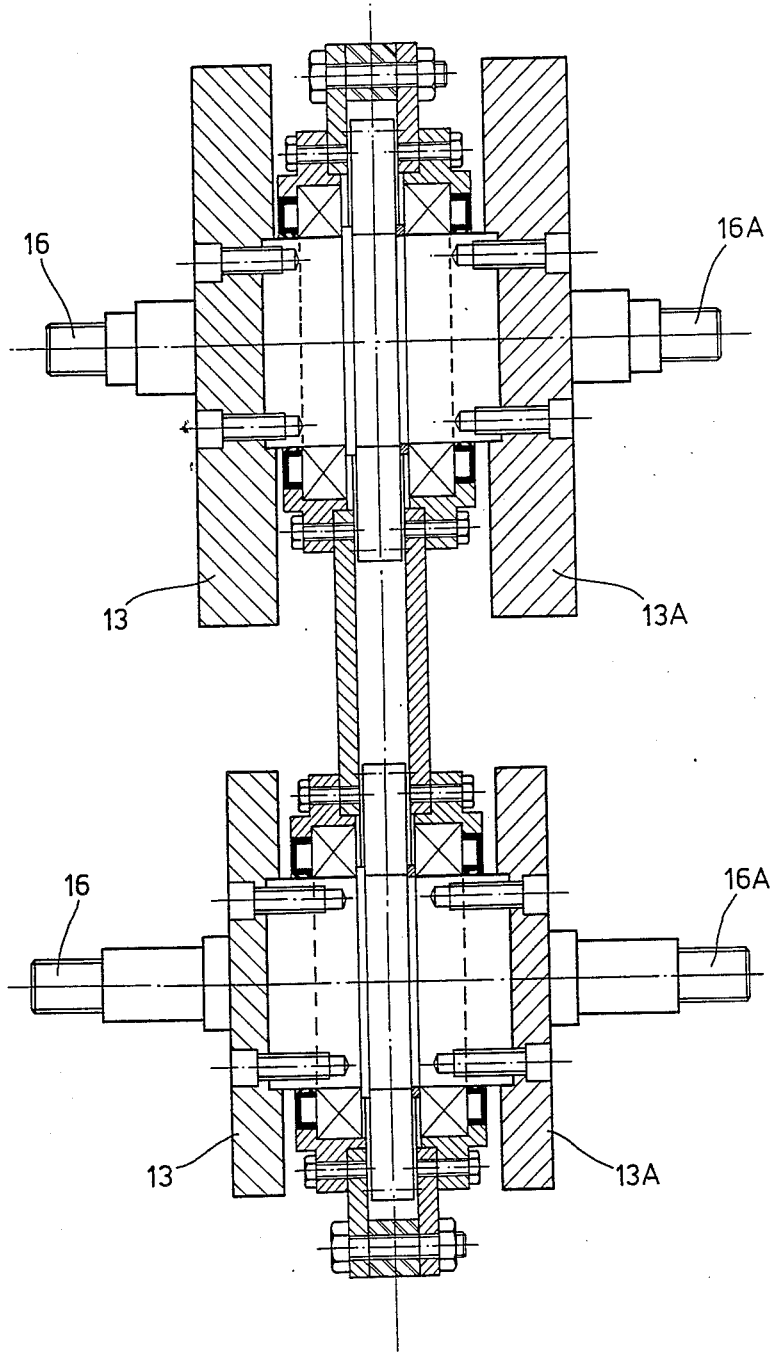
FIG. 5 is a cross-sectional view taken along line A—A of FIG. 4 showing how the two eccentrics can be one pairing of such eccentrics with another such pairing being on the other side of the housing.

FIG. 5 shows a pairing of eccentrics not showing the interconnecting idle and drive cogs of each (i.e. 12 and 14). It can be seen however that one crank assembly 13 can be oppositely out of phase with the paired crank assembly 13A such that connecting rods connected to portions 16 and 16A can drive a coring apparatus in an out of phase condition.

Figure 1:
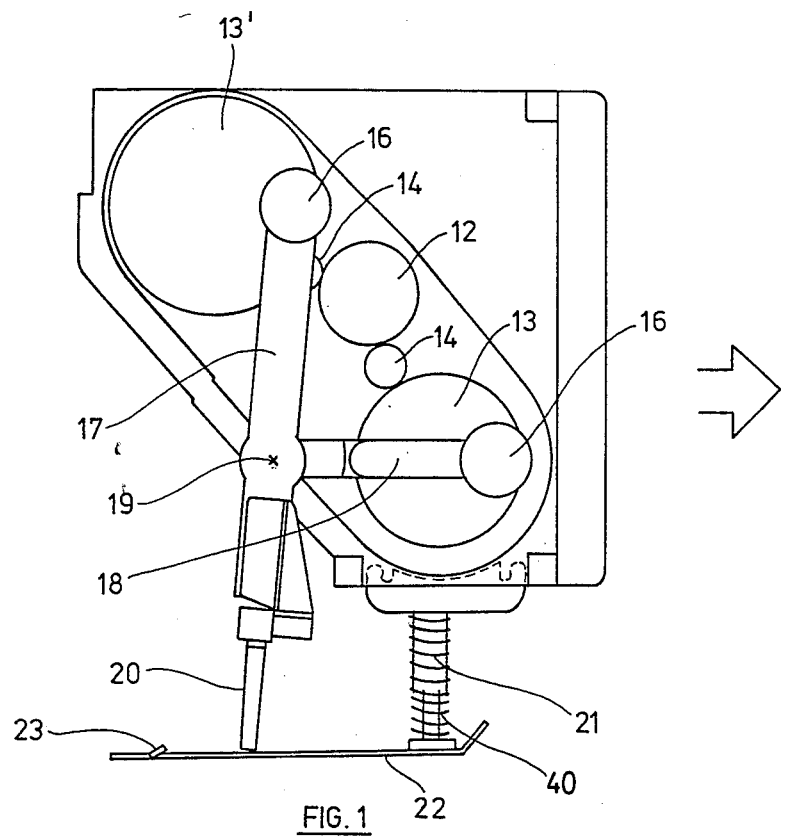
FIG. 1 is a schematic elevational view of a crank assembly with a corer looking transversely with respect to a machine and its direction of advancement (in the arrowed direction), showing below the ground coring element or elements (which are driven by two interconnected eccentrics through connecting rods operating substantially mutually at right angles), a skid adapted to ensure minimum surface disruption to the ground, the skid being biased downwardly against the ground by a compression spring about a telescopic mount limited as to degree of downward movement of the skid, the skid including at a trailing region of an opening (or slot) through which the core passes means to force the ground down under the skid.
Figure 2:
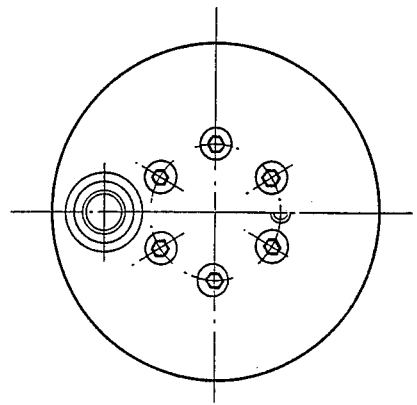
FIG. 2 is a detailed view of one of the two eccentric drives showing the means with which one end of one of the connecting members is engageable.

FIG. 1 shows diagrammatically a crank assembly with eccentrics 13 driven by cogs 12 and 14 and driving coring means through connecting, or crank, arms 17 and 18 which intersect substantially at right angles, the connecting arm 18 being pivoted on axis 19 to connecting arm 17.

Figure 6:
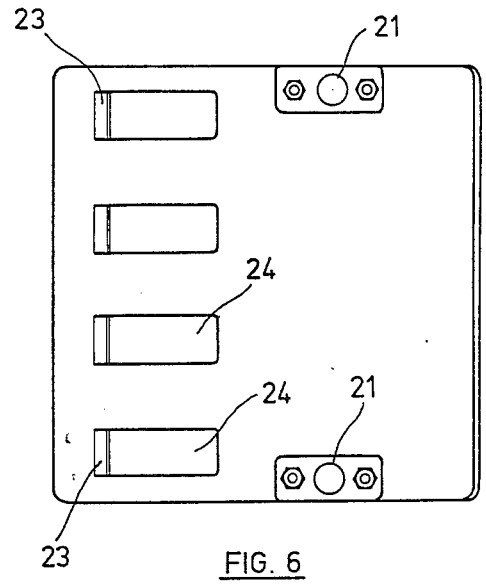
FIG. 6 is a top plan view of a preferred skid in accordance with the present invention showing how at each side stable telescopic means can position the same so that behind the skid front there are transversely arrayed a series of openings each for a ground coring and/or aerating member and each opening including a means to guide the soil surface back down to the general level of the skid.
Figure 7:
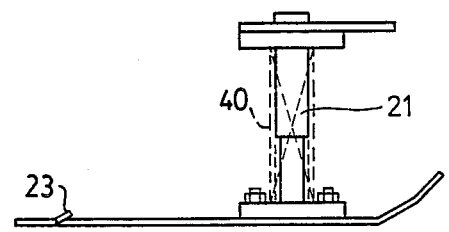
FIG. 7 is a transverse side view of the arrangement shown in FIG. 6 showing in broken outlines a compression spring acting on the telescopic means and showing the upturned ground guiding means positioned at the rear of each opening.

The coring means preferably comprises a plurality (eg. four) of tubes, or substantially tubular members, 20 at the base of the arm 17 and adapted when the device moves in the arrowed direction, as in FIG. 1, to lift up, drop down and move rearwardly as the machine advances while at the same time being lifted up. The telescopic supports 21 (see FIGS. 1, 6 and 7) support the skid 22 which is biased downwardly by compression spring 40. The skid includes upturned portions 23 which trail at the rear end of openings or slots 24 through which the coring tubes 20 pass. From FIG. 10 the out of phase nature of the cranking arrangement can readily be seen whereby six sets of four coring tubes 20 provide frequent transverse arrays of holes as the machine advances.

The gear box 7 preferably has the input shaft 6 with a cog 25 which drives a cog 26 on the intermediate shaft 27 which also carries a removable gear 28. Gear 28 is held in place by a pin such as an implement pin 29. Gear 28 meshes with a removable gear 41 of the output shaft 10. Removable gear 41 likewise is preferably held in place on its shaft by an implement pin 30.

Figure 8:
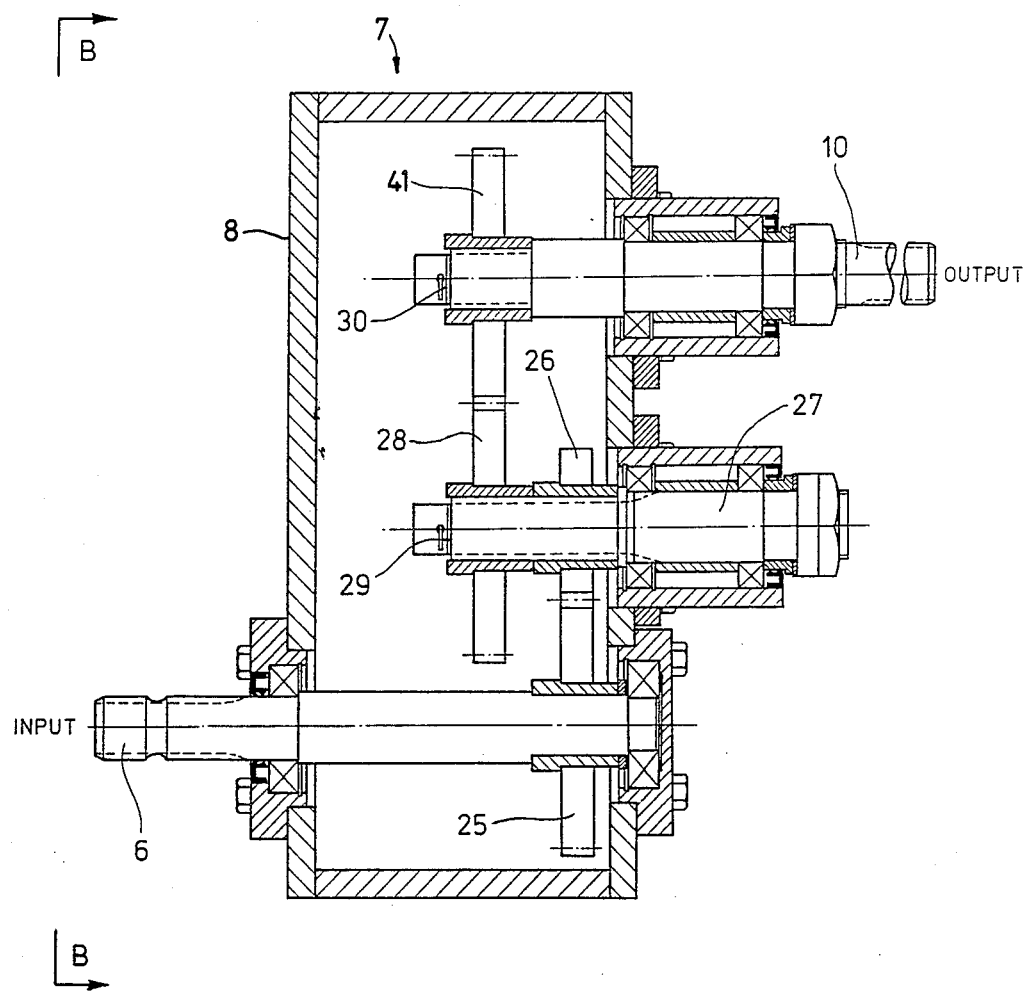
FIG. 8 is a cross-sectional view of a preferred gear box in accordance with the present invention showing an input shaft driving an intermediate shaft and that intermediate shaft in turn driving an output shaft and means whereby the splined output shaft and the splined intermediate shaft can have the interconnecting cogs thereof removed together with the sleeves thereof from each shaft each shaft having been splined for receiving such portions and including means to locate the same on the end thereof, (eg. an implement pin)
Figure 9:
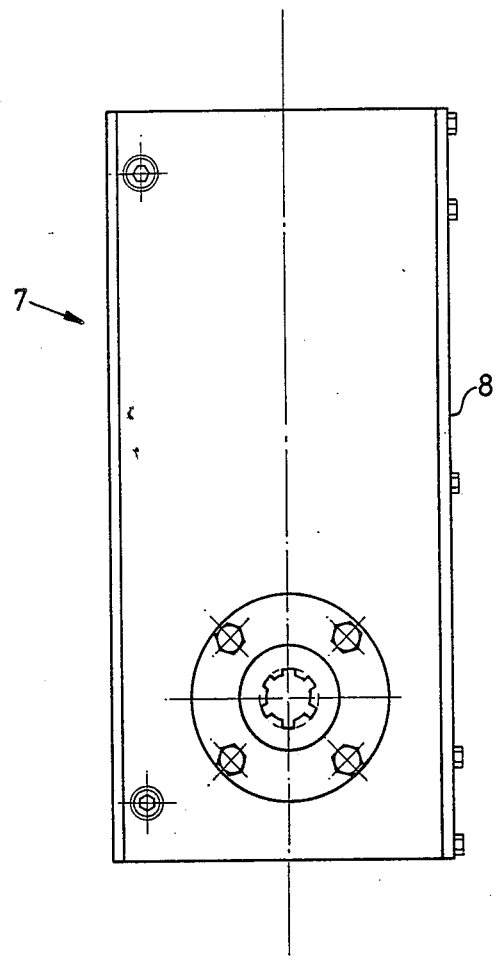
FIG. 9 is a view taken from line B—B of the arrangement shown in FIG. 8.

FIG. 8 shows the bearing, seal and other types of arrangement whereby the three shaft gear box is created and showing how access from the side or top of the arrangement shown will allow a filling of oil and/or grease and will allow access for the ready re-arrangement of the ratios of the gears 28 and 41 to thus ensure that the gearing of a particular implement can be set for the likely ground speed of the tractor operating speed and the requirements of the ground to be cored. Obviously it does not really matter whether the removable gear 41 is on the input or the output shaft.

Figure 4:
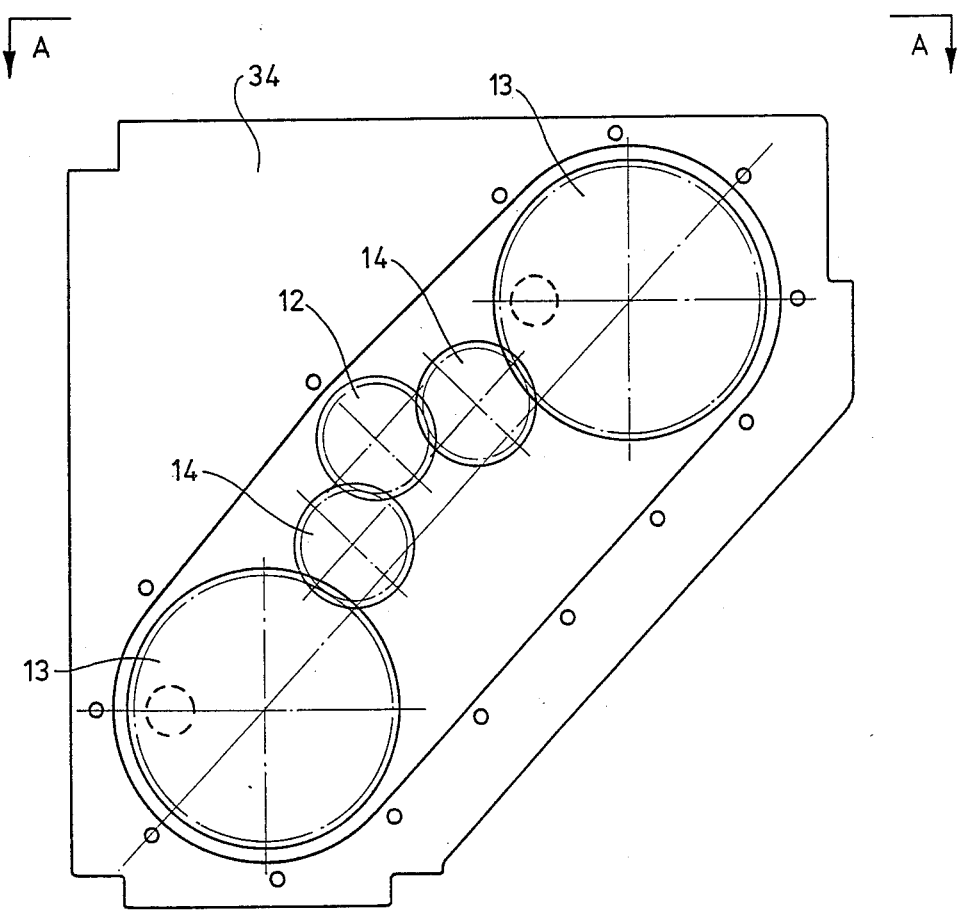
FIG. 4 is a side elevational view of a housing member showing in circular outline the two spaced eccentrics and the manner by which a power shaft from a gear box can drive each eccentric through two idler cogs.
Figure 11:
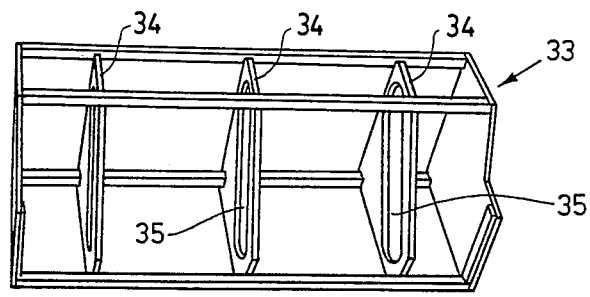
FIG. 11 is a perspective view of a sub frame for association with the remainder of the frame having three spaced members having openings therethrough each of which is capable of mounting two sets of paired eccentric driving means drivable by a shaft or composite shaft that passes centrally or substantially centrally therethrough.
Figure 13:
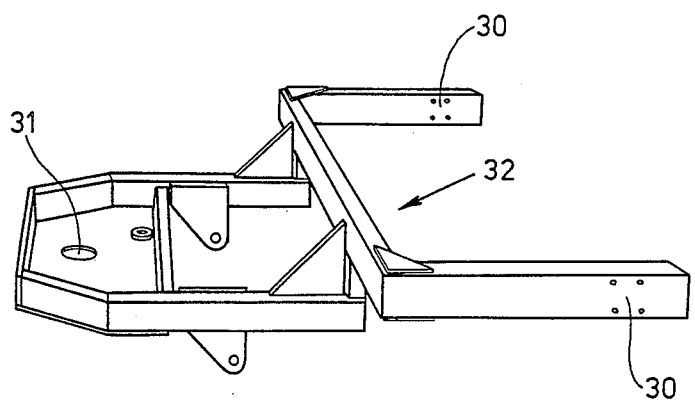
FIG. 13 is a perspective view of sub frame of the main frame, the frame as depicted being shown upside down with the bifurcated member to the right being adapted to support from below the sub frame member shown in FIG. 11 as well as support the stub axles of the main ground wheels, the portion of the frame to the left (when upturned) being adapted to support the leading dolly wheels to be towed, the gear box and the transmission therefrom back to the transverse shaft assembly.
Figure 14:
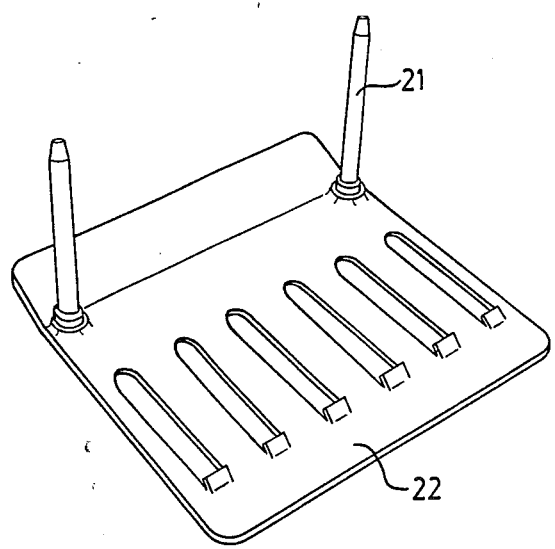
FIG. 14 is a perspective view of yet a further embodiment of the preferred skid showing a pair of spaced upstanding members capable of being received within sleeves to move upwardly and downwardly within sliding limits, the skid to be biased downwardly by an encircling spring between a shoulder about or forming part of the sleeves (not shown) and the skid proper.

FIG. 3 shows the preferred trailable apparatus having as a main frame the frame as depicted in FIG. 13 with the stub axles (not shown) for the ground wheels 2 being dependent from the bifurcations at 30 (the frame of FIG. 13 being inverted) and with the opening 31 providing the location for the dolly wheels 3. The bifurcated region 32 when inverted supports the frame or sub frame member 33 shown in FIG. 11. Sub frame 33 includes spaced members 34 having openings 35 therein which locate an assembly as shown in FIGS. 4 and 5.

Figure 12:
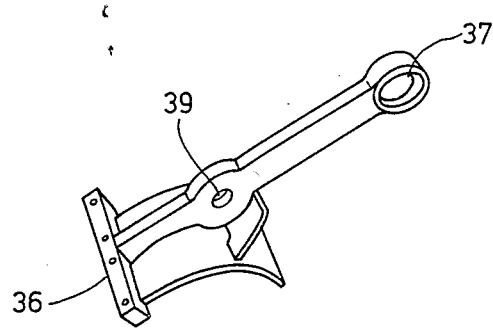
FIG. 12 is a perspective view of a preferred cranking arm capable of being cranked at its right hand end from one eccentric driving member and having at its other end means from which the ground coring means is dependent, the arm having intermediate the ends thereof means for providing a pivotal connection to the other cranking arm from the other driving eccentric of the pairing.
Figure 15:
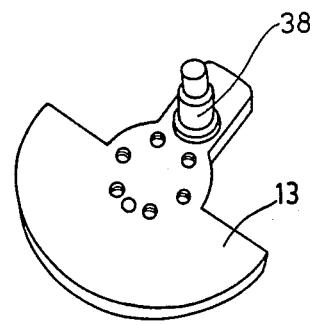
FIG. 15 is a perspective view of an eccentric driving member being adapted, for example, to engage with the right hand end of the member shown in FIG. 12, which itself requires attachment to, for example, a gear to be driven by the geared arrangement as shown in FIG. 4.
Figure 16:
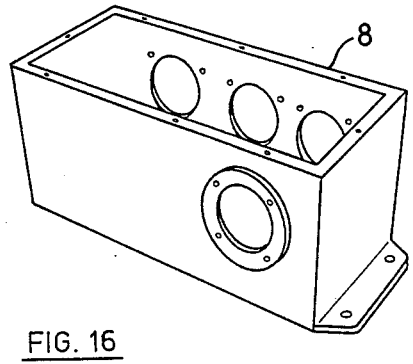
FIG. 16 is a perspective view of a preferred housing for a gear box as shown in FIGS. 8 and 9, there being shown the open side thereof to which a cover is to be attached to allow easy access for adjustment of the gearing ratios.

The connecting member shown in FIG. 12 carries at its end 36 the ground coring means while the other end 37 is preferably journaled on the member 38 of the eccentric driving means or part thereof shown in FIG. 15. The trailing boss or the like member about which the end 37 is journaled is depicted as 16 in FIG. 1, the member of FIG. 12 being depicted by reference number 17.

Midway between the ends 36 and 37 is an aperture 39 which provides the pivot at 19 shown in FIG. 1.

From the foregoing it can be seen that the present invention provides a trailable device having a number of features not previously known. It should also be appreciated that the improvements incorporated in the preferred trailable device of the present invention can be incorporated in self propelled forms of apparatus if desired.

I claim:

1. Ground coring and/or aerating apparatus comprising:

a frame movable over the ground in a direction of advancement;

a crank assembly mounted on said frame;

means providing a transmission of power to said crank assembly carried by said frame;

ground coring support means mounted on said frame and driven by said crank assembly;

ground coring means mounted on said ground coring support means and dependent therefrom, so that the action of said crank assembly periodically presses said ground coring means into the ground and withdraws the same therefrom while the frame advances; and skid means supported on and dependent from said frame comprising a skid having a forward part and a closed rear part and a bottom ground pressuring surface, at least one opening in said skid through which said ground coring means passes when pressed into the ground and from which said ground coring means is withdrawn when withdrawn from the ground, a rear portion on said at least one opening, and trailing guide means on said skid at said rear portion of said at least one opening for guiding uplifted soil and turf downwardly through said at least one opening and under said bottom surface of said skid.

2. Apparatus as claimed in claim 1 wherein said means providing a transmission of power to a crank assembly comprises:

a gear box having a housing, an input shaft, an intermediate shaft and an output shaft, a removable gear drive from the input shaft to the intermediate shaft, a removable gear drive from said intermediate shaft to said output shaft, and means to facilitate removal from and replacement of said gear drives to enable the adjustment of the ratio of the gear box.

3. Apparatus as claimed in claim 1 wherein said crank assembly comprises:

two synchronized rotatable eccentric driving members;

a separate connecting member pivotally and eccentrically connected to each driving member and extending substantially mutually at right angles with respect to each other, one of said connecting members comprising at least part of said ground coring support means.

4. Apparatus as claimed in claim 1 wherein:

said ground coring means comprises a plurality of ground penetrating members;

said at least one opening in said skid comprises a separate opening for each ground penetrating member;

said rear portion comprises a trailing boundary on each opening; and said trailing guide means comprises a raised ramp on said skid at each trailing boundary of each opening.

5. Apparatus as claimed in claim 4 and further comprising;

spring means for resiliently urging said skid to ride on the ground, said skid being movable upwardly against the bias of said spring means.

6. Ground coring/and or aerating apparatus comprising:

a frame supported at least in part on ground wheels for movement in a direction of advancement;

a gear box supported on said frame, said gear box having a housing, an input shaft, an intermediate shaft, and an output shaft, a gear drive from said input shaft to said intermediate shaft, a gear drive from said intermediate shaft to said output shaft, and means to connect said input shaft to a power source;

a shaft means rotatably mounted on and extending substantially transversely of said frame relative to said direction of advancement and rotatably driven by transmission from said output shaft of said gear box;

a plurality of sets of spaced pairs of eccentric driving members rotatably mounted on said frame on respective axes of rotation, said axes of rotation being spaced and substantially parallel;

ground coring support means depending from at least one pair of said eccentric driving members;

ground coring means on said ground coring support means;

crank arms eccentrically connected to said at least one pair of eccentric driving members, one crank arm being connected to said ground coring support means and the other crank arm being pivotally connected to said one crank arm through a pivot on a pivot axis extending substantially parallel to the axes of rotation of said eccentric driving members, so that rotation of said eccentric driving members during a cranking cycle causes said ground coring means to advance, lower, rise and trail before commencing a new cycle with said crank arms being substantially at right angles relative to each other;

skid means depending from said frame for movement upwardly and downwardly relative thereto; and at least one opening in said skid means through which said ground coring means passes for penetrating into the ground as the apparatus advances, said skid means providing ground pressuring during coring;

said at least one opening in said skid means having a trailing extremity; and guide means on said skid means at said trailing extremity for guiding uplifted soil and turf downwardly to the same level as the general bottom surface of said skid means.

7. Apparatus as claimed in claim 6 wherein:

said guide means comprises at least one ramp member.

8. Apparatus as claimed in claim 6 wherein:

said skid means is supported on said frame for raising and lowering in a guidable manner relative to said frame; and spring means are provided for urging said skid means to exert pressure on the ground during normal operation.

9. Apparatus as claimed in claim 6 wherein:

a plurality of said ground coring support means, ground coring means, pairs of eccentric driving members, and respective crank arms are provided;

said at least one opening in said skid means comprises a plurality of elongated slots, each slot receiving respective ground coring means and having a trailing extremity; and said guide means comprises an upwardly forwardly extending ramp member extending from each trailing extremity of each slot.

10. Apparatus as claimed in claim 9 and further comprising:

telescopic support members for supporting said skid means on said frame; and spring means between said frame and said skid means and surrounding said telescopic support members for resiliently urging said skid means away from said frame member.

11. Apparatus as claimed in claim 6 wherein:

said gear drives are removably mounted on the respective shafts; and means are provided to facilitate removal from and replacement on said respective shafts of gear drives having various ratios for adjustment of the gear box ratio to adjust for the desired operating ground speeds.

* * * * *